Sept. 11, 1945.   J. H. CRUMBLE   2,384,728
VEHICLE
Filed April 27, 1944   2 Sheets-Sheet 1

INVENTOR
James H. Crumble
BY J. Ledermann
ATTORNEY

Sept. 11, 1945.    J. H. CRUMBLE    2,384,728
VEHICLE
Filed April 27, 1944    2 Sheets-Sheet 2
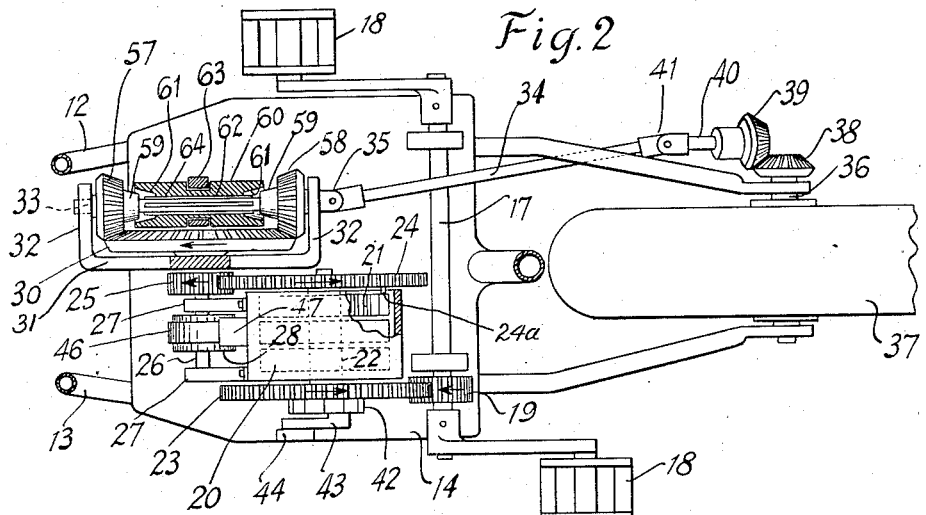
INVENTOR.
James H. Crumble
BY J. Ledermann
ATTORNEY Patented Sept. 11, 1945

2,384,728

UNITED STATES PATENT OFFICE 2,384,728

VEHICLE

James H. Crumble, Brooklyn, N. Y.

Application April 27, 1944, Serial No. 532,958

5 Claims. (Cl. 280—215)

This invention relates to wheeled vehicles, and more particularly to those of the bicycle type, although it may be just as well applied to three or four-wheeled vehicles. The invention is an improvement over the "Bicycle driving mechanism" disclosed in Patent No. 2,277,391 which was issued to me on March 24, 1942, in which patent a spring winding mechanism is set forth applied to a bicycle and adapted to be wound up by means of the foot cranks or pedals thereof for the purpose of storing up energy in the spring, which energy may be utilized to propel the vehicle whenever desired.

The improvement of the present invention relates to the provision of means whereby the momentum of the bicycle in traveling either down hill or on a level path may be utilized simultaneously as a braking means for the vehicle and as a means for rewinding the spring, as well as to means for control of the same in a simple, safe and positive manner. It is therefore the main object of this invention to provide the means for achieving the ends just mentioned, and other and additional objects will become apparent in the description below, with reference to the accompanying drawings wherein characters of reference or reference numerals mentioned in the description have been applied to the parts referred to. Regarding the drawings, it is to be understood that the same is intended for the purpose of illustration only, and it is neither intended nor desired to limit the invention necessarily to the exact details of construction therein shown excepting insofar as they may be deemed essential to the invention.

Referring briefly to the drawings, Fig. 1 is a side elevational view, with parts broken away and parts omitted, of a bicycle provided with a pedal-wound spring motor and the improvements presented by the present invention.

Fig. 2 is a fragmentary plan view of Fig. 1, partly in section on the line 2—2 of Fig. 1 and with parts broken away.

Fig. 3 is a cross-sectional view taken on the line 3—3 of Fig. 1.

Fig. 4 is a cross-sectional view taken on the line 4—4 of Fig. 3.

Fig. 5 is a fragmentary plan view of the forward portion of the bicycle.

Figure 1:
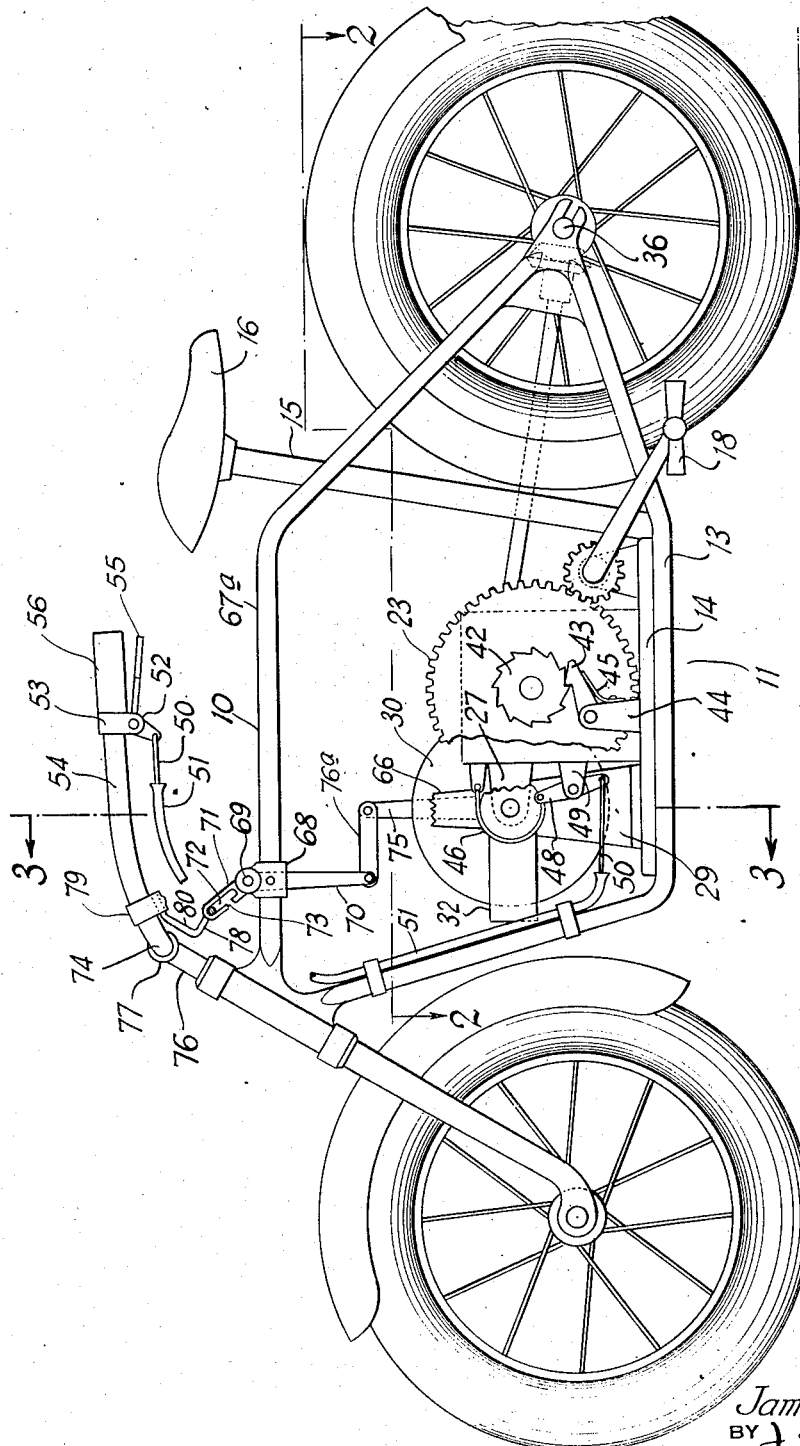

Referring in detail to the drawings, the numeral 10 indicates the frame of a bicycle whose lower section 11 is formed of two spaced members 12 and 13 upon which a platform 14 is supported and secured by suitable means, not shown. Rotatably mounted forward of the post 15 supporting the driver's seat 16, is a pedal shaft 17 provided with the usual crank pedals 18. A pinion 19 is fixed on the shaft 17.

A housing 20 is mounted on the platform 14 and houses a coiled spring 21 which may, as shown in Fig. 2, be formed of a plurality of separate coiled springs positioned side by side. A shaft 22 is rotatably mounted in the housing 20 and has the inner end of the spring 21 secured thereto, not shown. On one side of the housing 20, a gear 23 is fixed to the shaft 22 and lies in mesh with the pinion 19. On the opposite side of the housing 20, a gear 24 is loosely mounted on the shaft 22 and lies in mesh with a pinion 25 secured to a shaft 26 which is rotatably mounted in extension ears 27 from the housing 20, and which has a brake drum 28 thereon intermediate its length. The outer end of the spring 21 is secured to the gear 24 as shown at 24a. As far as thus described, the mechanism is substantially the same as that set forth in my above-mentioned Patent No. 2,277,391.

A bracket 29 is mounted on the platform 14, through the upper end of which the shaft 26 projects, and a bevel gear 30 is rigid on the end of the shaft 26. A horizontal extension bracket 31 extends from both sides of the top of the bracket 29, and at its extremities is provided with parallel arms 32 having a shaft 33 supported in bearings formed therein. This shaft 33 projects through the rearward arm 32 and is joined to a drive shaft 34 through the medium of a universal joint or coupling 35. The rear axle 36 to which the rear wheel 37 is fixed, is provided with a bevel pinion or gear 38 which is in mesh with another bevel pinion or gear 39, the latter being fixed on the end of a shaft 40 coupled by a universal joint 41 to the drive shaft 34. No frame or supporting means for the shaft 40 have been shown, but any such means as may be desired may of course readily be supplied.

A ratchet 42 is secured on the outside of the gear 23, and a pawl 43, pivoted on a pedestal 44 mounted on the platform 14, is normally urged into engagement therewith by a spring 45. A brake band 46 partly encircles the brake drum 28, having its upper end secured to an extension 47 of the housing 20 and its lower end secured to the upper end of a lever 48 pivoted on an extension 49 of the housing 20. The lower end of the lever 48 has a flexible cord, or wire, 50, secured thereto, which passes upward through a guide tube 51 secured to the bicycle frame. The upper end of the wire 50 is secured to a bell crank 52 pivoted on a bracket 53 secured to one handle bar 54, with the long arm 55 of the bell crank positioned under the hand grip 56 for ready operation by the rider. It is apparent that pressing of the arm 55 toward the hand grip 56 will tighten the brake band 46 about its drum 28. The mechanism set forth in this paragraph is likewise substantially disclosed in my above-mentioned issued patent.

On both ends of the shaft 33 mutually opposed bevel pinions 57 and 58 are loosely mounted and permanently in mesh with the bevel gear 30, so that rotation of the latter causes simultaneous rotation of the pinions 57 and 58 in mutually opposite directions. These pinions are provided with inwardly projecting conical hubs 59. A cylinder 60 surrounds the shaft 33 and its ends are provided with conical recesses 61 complementary to the hubs 59. By means of keys 62 retained in the shaft 33 and registering in longitudinal slots 64 in the cylinder 60, the latter is slidable on the shaft 33 but rotates integrally therewith.

The prongs of a fork 63 are loosely positioned in a peripheral groove 65 in the cylinder 60 and form the extension of a lever 75 pivoted at 75a to an extension 66 of the bracket 29. The upper member 67a of the frame 10 is formed of two tubular rods 67, and on one of these a bracket 68 is secured through which extends a horizontal pin 69 rotatable therein. An arm 70 depends rigidly from one end of the pin 69, and a second arm 71 extends rigidly and angularly upward and forward from the pin 69. The upper end of the arm 71 has a substantially longitudinal slot 72 and an entry slot thereinto at 73.

The yoke 74 of the handle bars is secured to the steering post 76 by means of two spaced rings or sleeves 77 integral with the post, in which the yoke is rotatable. An arcuate member, 78, preferably circular in cross section, has its extremities 80 bent upward at substantially right angles to the plane thereof and anchored against the two handle bars by means of sleeves 79. The plane of the arcuate member 78 is also at right angles to the steering post 76 and it is concentric with respect to the latter. The arcuate member 78 registers slidably in the slot 72 of the arm 71. It is now apparent that, through the medium of the linkage between the rigid arcuate member 78 and the fork 63, lowering of the handle bars about their yoke as a pivot will push the cylinder 60 to the left as shown in Fig. 2 to engage the same with the pinion 57 and thereby lock the latter on the shaft 33. Contrariwise raising of the handle bars a sufficient distance from the last-named position will cause interlocking of the shaft 33 with the pinion 58. Maintaining the handle bars in an intermediate position between those just mentioned will disengage the shaft 33 from both pinions.

Owing to the similarity of the relative positions of the arcuate member 78 and the slot 72 throughout the arcuate length of the member 78, as is above apparent, the handle bars will actuate the clutch shift as above described regardless of the direction in which the bicycle is steered, and whether the vehicle is traveling straight ahead or is making a turn, lifting or lowering the handle bars as set forth will actuate the clutch shift. It is, however, desirable that the handle bars may rest in any one of the three positions mentioned instead of having to be held there by the rider. For that purpose the following further improvement has been provided.

The upper portion of the steering post 76 is made hollow in any suitable manner, to leave a compartment 81 at the top thereof. Therein is slidably mounted a cylindrical plug 82 with a spring 83 thereunder normally urging the plug upward. A slot 84 is provided in the rearward side of the hollow end of the post, through which a finger 85 slidably projects, serving as a guide to restrain the plug to longitudinal movement and also for the purpose presently to be stated. The upper portion of the plug is formed into a tooth 86 whose width is equal to the diameter of the post. A ring 87, or sleeve, is rigidly mounted on the yoke 74 between the sleeves 77, and is provided with a plurality of spaced ratchet teeth 88 leaning in a clockwise direction (Fig. 4). The tooth 86, which is pawl-like as shown, is normally urged against the teeth 88 by the spring 83 and when in engagement between two teeth 88 it releasably locks the handle bars in position so that they need not be held up by the driver.

The steering column in which the steering post 76 is pivotally mounted, is shown at 89. Secured pivotally on a bracket 91 on the other handle bar 90 at a point convenient to the hand grip 56 on that side, is a bell crank lever 93 whose long arm 93a is spaced below the hand grip and whose short arm 94 has a wire 95 secured thereto which passes in a tube 96 which may be secured to the frame or post 76 by any means, not shown. The end 97 of the wire touches the finger 85, and, as is obvious, serves to push the same downward against the spring 83 to disengage the tooth 86 from the teeth 88. It is apparent that when the lever arm 93 is moved toward its adjacent hand grip 56 the tooth 86 will be moved out of engagement with the teeth 88 so that the handle bars may be lifted or lowered, and when the lever is again released the spring 83 will restore the tooth 86 to engagement with the teeth 88 and also restore the lever 93 to its normal position spaced at a greater distance from the hand grip.

The spring motor within the housing 20 is wound in the manner set forth in my above-identified patent, by rotating the pedals 18 in the normal manner of driving a bicycle, that is, counter-clockwise (Fig. 1), with the brake 46 applied by the arm 55 of the bell crank 52. When the motor is fully wound, the handle bars are depressed (after the lever 93 is gripped and drawn toward the hand grip to release the tooth 86 from the teeth 88), thereby obviously pushing the cylinder 60 to the left (Fig. 2) and engaging bevel pinion 57 with bevel gear 30. When this has been done, the lever 93 is again released, locking the handle bars in that position, and release of the brake 46 will enable the spring motor to drive the shaft 34 and bevel gears 39 and 38 in the proper direction to propel the vehicle forward. The directions of rotation of the various gears and pinions are shown by arrows in Fig. 2.

When it is desired to coast freely, the tooth 86 is again disengaged by lifting the lever 93 and raising the handle bars a short distance, probably the distance of one tooth 88; the exact amount of lifting of the handle bars, as well as depressing or lowering them to obtain neutral position, will of course be acquired by experience. When neutral position of the cylinder 60 has been attained, the lever 93 is again released to lock the handle bars in that position. To engage the pinion 58 with the gear 30, in order that the momentum of the moving vehicle may rewind the spring motor and simultaneously that the rewinding of the motor may serve to brake the vehicle, the handle bars are raised still further after first lifting the lever 93 and the latter is again released. After the handle bars are thus lifted to their maximum height, and pinion 58 has been engaged with the cylinder 60, it is apparent that rotation of the pinion 58 caused by the forward momentum of the vehicle, will, while the pedals 18 are held stationary, cause motor gear 24 to be turned in the opposite direction to that shown in Fig. 2 by the arrow, thereby rewinding the spring motor 21. When the momentum of coasting is thus absorbed by the spring motor the vehicle is gradually braked and will be brought to a stop if the cylinder 60 is not again shifted back to the left (Fig. 2) to again utilize the stored energy of the motor to propel the vehicle. Thus the vehicle may be run over a considerably longer distance by utilizing the spring motor both as a brake and a self- or re-winding means therefor.

Obviously, modifications in form and structure may be made without departing from the spirit and scope of the invention.

It is to be noted that when the spring 21 of the motor is completely unwound and the pedals are turned in the usual direction, that is, to propel a bicycle, and if the brake 46 is left unapplied, then, after the spring 21 has been wound to a sufficient degree, or perhaps even nearly fully wound, the drive gear 24 will begin to rotate in the direction of the arrow, Fig. 2. If the bevel pinion 57 is at the same time engaged with the cylinder 60, it is obvious that the bicycle will be propelled by this action. Hence, if it is desired at any time to propel the vehicle by pedaling instead of by means of the spring motor, the same may obviously be done, and the vehicle presented will serve as an ordinary pedal driven bicycle, with the spring 21 under compression serving as the connecting means between the pedal driven gear 23 and the drive gear 24.

The gear or transmission shift mechanism obviously provides means for utilizing the stored energy of the motor at any time desired, while thus propelling the vehicle by pedaling, by simply stopping the pedaling and holding the pedals in a fixed position of rest for the rider and permitting the compressed spring to unwind. This feature permits of aid to the driver in going up hill, as he can store up energy in the motor while coasting down hill and utilize the stored energy as an aid in going up the next hill. He might even have permitted the spring to wind up completely during the descent, and then if the hill is steep he may both pedal and also utilize the wound up spring to give added driving power to the vehicle.

Additional braking means, not shown, might of course be applied to one or both of the bicycle wheels, and the invention as presented may well be applicable to other purposes than those above enumerated.

I claim:

1. In a vehicle having a spring motor mounted thereon, said motor comprising a pair of spaced gears having a spring therebetween, one of said gears constituting a drive gear and having one end of said spring secured thereto, the other of said gears having a shaft extending through said motor and having said drive gear loosely mounted thereon, the other end of said spring being anchored to said shaft, a pinion in mesh with said drive gear and having a shaft integral therewith, said pinion shaft having a bevel gear rigid thereon, a third shaft mounted adjacent the end of and at right angles to said second shaft and having bevel pinions loosely mounted thereon at the ends thereof in mesh with said bevel gear, a sleeve slidably mounted on said shaft between said bevel pinions, said sleeve having on the ends thereof clutch means for interlocking said sleeve selectively with said bevel pinions, a drive shaft operatively connected with one of said bevel pinions and one of the traction wheels of the vehicle, and means for shifting said sleeve selectively into engagement with either of said bevel pinions.

2. A vehicle having a pedal shaft rotatably mounted thereon and having pedalled cranks secured to the ends thereof, a gear rigid on said shaft and a second gear spaced from said first gear loosely mounted on said shaft, a coiled spring having one end anchored in said shaft and the other end anchored in said loose gear, a pinion in mesh with said loose gear and having a shaft integral therewith, said shaft having a bevel gear rigid thereon, a shaft rotatably mounted adjacent said bevel gear and at right angles to the axis thereof, said third shaft having bevel pinions loosely mounted on the ends thereof in mesh with diametrically opposite sides of said bevel gear, a sleeve slidably mounted on said third shaft, said sleeve being keyed to said third shaft to rotate with said third shaft, interlocking means partly on the ends of said sleeve and partly on said bevel pinions, means for selectively shifting said third shaft to interlock selectively with said bevel pinions, a drive shaft operatively connected between said third shaft and one of the wheels of the vehicle.

3. The device set forth in claim 2, having means for braking said loose gear.

4. The device set forth in claim 2, said shifting means comprising a forked lever engaging said sleeve and pivotally mounted intermediate its length, a lever pivotally mounted on the vehicle frame and connected with said forked lever.

5. The device set forth in claim 2, said shifting means comprising a forked lever engaging said sleeve and pivotally mounted intermediate its length, said vehicle being dirigible and having a steering rod or the like, a lever pivotally mounted adjacent said steering rod and connected with said forked lever, said steering rod having an arcuate member supported thereon concentric with the axis of said steering member, said second lever having a slotted extension extending angularly toward said arcuate member, said arcuate member registering slidably in said slotted extension.

JAMES H. CRUMBLE.